United States Patent Office 3,301,882
Patented Jan. 31, 1967

3,301,882
MANUFACTURE OF NORMAL LEAD 2:4-DINITRORESORCINATE
George William Charles Taylor, 7 The Cobbins, and John Richard White, 81 Monkswood Ave., both of Waltham Abbey, Essex, England
No Drawing. Filed Jan. 7, 1964, Ser. No. 336,116
Claims priority, application Great Britain, Jan. 7, 1963, 765/63
4 Claims. (Cl. 260—435)

This invention relates to the manufacture of lead 2:4-dinitroresorcinate in a form suitable for use as a delay or priming composition.

The lead salts of 2:4-dinitroresorcinol, particularly the substance corresponding in composition to the normal salt, have valuable applications as priming or delay compositions for detonators and fuses.

An object of the present invention is to provide an improved method of manufacture of normal lead 2:4-dinitroresorcinate for use as a priming or fast delay composition in a granular, free flowing form without the adition of an inert non-explosive substance.

The normal salt may be prepared by the addition of a solution of a lead salt to a solution of 2:4-dinitroresorcinol prepared by dissolving 2:4-dinitroresorcinol in a caustic alkali solution.

We have found that by suitable adjustment of the conditions of precipitation as hereinafter described a proportion of the salt may be precipitated in a gel-like form which acts as a binding substance for the bulk of the salt and results in the formation of spherical type granules which are very free-flowing and dust-free.

According to the invention, a process for the manufacture of normal lead 2:4-dinitroresorcinate in a granular free-flowing form comprises interacting at an elevated temperature a solution containing 2:4-dinitroresorcinol and sufficient alkali to give a pH value between about 3.3–6.6 and a solution containing a quantity of a soluble lead salt, whereby normal lead 2:4-dinitroresorcinate is precipitated as a mixture of colloidal and crystalline forms, the colloidal form being present in small proportion and acting as a binder for the crystalline form.

The quantity of soluble lead salt required is preferably less than the stoichiometric quantity required to convert the 2:4-dinitroresorcinol to the corresponding normal lead salt and the temperature at which the solutions are interacted should be between about 50°–100° C.

The most suitable temperature for interaction of the solution and the most suitable pH of the 2:4-dinitroresorcinol/alkali solution depend upon the particular alkali used.

When, for example, the alkali used is sodium hydroxide the temperature required is normally in the range 55°–85° C. and preferably about 65° C., with the pH in the range 3.3–5.6 and preferably 3.8–4.2. When the alkali used is potassium hydroxide a higher temperature, normally in the range 70°–95° C. and preferably 75°–80° C., is required, with a pH in the range 3.8–6.6 and preferably 4.6–4.8.

The concentration of the 2:4-dinitroresorcinol is preferably between about 30–50 g./litre. It is advantageous for the concentration of 2:4-dinitroresorcinol to be as high as possible since this will result in the highest yield of normal lead 2:4-dinitroresorcinate for a given volume of solution. The upper concentration limit of the 2:4-dinitroresorcinol is normally determined by the necessity for preventing its solution with alkali from crystallizing out during storage and handling. This safe concentration limit is about 50 g./l. and solutions having a lower concentration than this will not normally crystallize out at ambient temperatures above about 10° C.

In general the proportion of gel-like binding substance formed may be increased by increasing the concentration of the alkali-dinitroresorcinol solution of lowering the precipitation temperature.

Particular examples of the preparation of normal lead 2:4-dinitroresorcinate in accordance with the invention will now be described.

Example 1

A stock solution of sodium 2:4-dinitroresorcinate is prepared by adding 6,250 g. (dry weight) 2:4-dinitroresorcinol to 95 litres of distilled water being stirred at 45° C., heating the aqueous suspension to 65° C., adding 11.25 litres sodium hydroxide solution (100 g. NaOH/litre) slowly with stirring to the hot suspension, and finally cooling the resulting solution to 20° C. and diluting it with distilled water to a volume of 123 litres to yield a solution of sodium 2:4-dinitroresorcinate (containing 50–52 g. 2:4-dinitroresorcinol/litre) having a pH of 4.0±0.1.

8.33 litres of a solution of lead acetate in water (318 g./litre, density 1.1933 g./ml. at 20° C.) are added with stirring to 30 litres of the stock solution of sodium 2:4-dinitroresorcinate at 65° C. during 25 minutes. The resulting solution is stirred for a further five minutes at 65° C., cooled to 40° C., and the precipitated lead 2:4-dinitroresorcinate allowed to settle. The supernatant mother liquor is decanted and the precipitated product is transferred by means of a water spray to a drying pot where it is drained of water by vacuum and washed twice with methylated spirits. The product is finally dried and passed through an earthed 40 B.S.S. stainless steel screen.

The yield of normal lead 2:4-dinitroresorcinate is 2268 g. of brown, almost spherical granules which are extremely free-flowing and which have a bulk density of 1.02 g./ml. and an average particle diameter of 0.10 mm.

Example 2

59 mls. of lead acetate solution, 284.4 g.

$$Pb(CH_3COO)_2 \cdot 3H_2O/litre$$

are added with stirring to 300 mls. of potassium dinitroresorcinate solution containing 9.0 g. 2:4-dinitroresorcinol and 1.8 g. potassium hydroxide during 15 minutes and the temperature of the solution is maintained at 75° C. for three-quarters of an hour after the beginning of the addition. The resulting stirred suspension of product in mother liquor is cooled to 30° C., the stirring is stopped and the product is allowed to settle. The mother liquor is decanted and product obtained as described in Example 1. The yield is 14.55 g. of granular, free-flowing, normal lead 2:4-dinitroresorcinate having a bulk density of 0.95 g./ml. and an average particle diameter of 0.10 mm.

What we claim is:

1. A process for the manufacture of normal lead 2:4-dinitroresorcinate in a granular, free-flowing form which comprises interacting at a temperature between about 50° and 100° C. a solution containing 2:4-dinitroresorcinol and sufficient caustic alkali therein to provide a pH value between about 3.3 and 6.6 with a solution consisting essentially of a soluble lead salt, said salt being present in said solution in a quantity less than the stoichiometric quantity required to convert 2:4-dinitroresorcinol to normal lead 2:4-dinitroresorcinate, whereby normal lead 2:4-dinitroresorcinate is precipitated as a mixture of colloidal and crystalline forms, the colloidal form being present in a relatively small proportion and acting as a binder for the crystalline form.

2. A process according to claim 1 in which said caustic alkali is sodium hydroxide and said temperature is between about 55° and 85° C.

3. A process according to claim 1 in which said caustic alkali is potassium hydroxide and said temperature is between about 70° and 95° C.

4. A process according to claim 1 wherein the solution of 2:4-dinitroresorcinol and alkali contains between about 30 and 50 g. 2:4-dinitroresorcinol per litre.

References Cited by the Examiner

UNITED STATES PATENTS 2,493,549  1/1950  Rubenstein _____ 260—435
2,493,551  1/1950  Rubenstein _____ 260—435

TOBIAS E. LEVOW, *Primary Examiner.*

E. C. BARTLETT, H. M. S. SNEED,
*Assistant Examiners.*